United States Patent
Levine et al.

(10) Patent No.: US 8,130,202 B2
(45) Date of Patent: Mar. 6, 2012

(54) INFRARED TOUCH SCREEN GATED BY TOUCH FORCE

(75) Inventors: James L. Levine, Yorktown Heights, NY (US); Susan A. Luerich, Cary, NC (US); Duane Scott Miller, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 988 days.

(21) Appl. No.: 11/742,680

(22) Filed: May 1, 2007

(65) Prior Publication Data

US 2008/0273013 A1    Nov. 6, 2008

(51) Int. Cl.
*G09G 5/00*    (2006.01)
(52) U.S. Cl. .............. 345/173; 345/175; 178/18.09
(58) Field of Classification Search .......... 345/173–179; 178/18.01–18.09
See application file for complete search history.

(56) References Cited

U.S. PATENT DOCUMENTS

| | | | | |
|---|---|---|---|---|
| 5,570,302 | A * | 10/1996 | Kobayashi et al. | 345/177 |
| 5,923,319 | A * | 7/1999 | Bishop et al. | 345/175 |
| 6,208,330 | B1 * | 3/2001 | Hasegawa et al. | 345/173 |
| 2002/0075243 | A1 * | 6/2002 | Newton | 345/173 |
| 2006/0132450 | A1 * | 6/2006 | Yamada et al. | 345/173 |

FOREIGN PATENT DOCUMENTS

CN    101206548 A    6/2008

OTHER PUBLICATIONS

English Abstract for Publication No. CN101206548, Jun. 25, 2006.

* cited by examiner

*Primary Examiner* — Regina Liang
(74) *Attorney, Agent, or Firm* — F. Chau & Associates, LLC; Daniel P. Morris, Esq.

(57) ABSTRACT

A touch-sensitive display device includes a display. A transparent plate is provided in front of the display. A tactile sensor senses a touch event. One or more infrared sensors are positioned in front of the transparent plate. The one or more infrared sensors identify a location of the touch event when the tactile sensor detects a touch event.

21 Claims, 7 Drawing Sheets

INFRARED TOUCH SCREEN GATED BY TOUCH FORCE

BACKGROUND OF THE INVENTION

1. Technical Field

The present disclosure relates to a touch screen and, more specifically, to an infrared touch screen gated by touch force.

2. Discussion of the Related Art

Touch screens are touch sensitive display devices that act as both an input device and an output device by incorporating a computer display with a sensory overlay so that information may be displayed and received on the same screen. Touch screens are commonly incorporated into general purpose computers, computer terminals, electronic and computerized appliances, computerized kiosks, personal digital assistants (PDAs), smart phones and other portable electronic devices. Touch screens are particularly suited for devices where portability, simplicity and/or durability are important.

There are a number of different types of touch screen technologies. Resistive touch screens utilize a thin transparent outer layer separated from a thin transparent inner layer by a set of insulating spacers. The outer surface of the inner layer and the inner surface of the outer layer are each coated with a transparent metal oxide coating such as indium tin oxide (ITO). The inner and outer layers thereby function, as a switch. A touch event forces the inner and outer layers into electrical contact thereby completing a circuit. By varying the voltages applied to each layer and by relying on the resistive nature of the ITO coating, the location of the touch event upon the touch screen can be calculated.

However, because resistive touch screens utilize multiple partially transparent layers between the display device and the user, the clarity of the display is compromised. Moreover, with extended use, visual imperfections may occur as the layers degrade thereby creating localized areas of distorted display.

Capacitive touch screens utilize a transparent metal oxide coating such as ITO to provide a continuous electrical current across a sensor having a reference capacitance field. When a person touches an area of the ITO coating either with a finger or a conductive stylus, the reference capacitance field is altered. The change to the capacitance field may be sensed and analyzed to identify the coordinates of the touch event.

However, capacitive touch screens suffer form poor long-term accuracy and other related problems. Moreover, capacitive touch screens may not recognize touches from articles that do not conduct electricity.

Acoustic pulse recognition touch screens utilise multiple piezoelectric transducers to provide an electrical signal from observed vibrations caused by touch. The electrical signals are then compared against known touch profiles to determine the location of the touch event.

Acoustic pulse recognition touch screens are presently quite expensive and as a result are not suitable for common applications.

Infrared touch screens 10, as illustrated in FIGS. 1 and 2, utilize a row of x-axis infrared emitters 16 and a corresponding row of x-axis infrared sensors 18. A column of y-axis infrared emitters 12 and a corresponding column of y-axis infrared sensors 14 are also used. The infrared emitters and sensors 16, 12, 18 & 14 are positioned over the surface of the display device. In the absence of a touch event, all of the infrared sensors 14 & 18 sense infrared light from the corresponding emitters 12 & 16. When a hand 20 or stylus comes into contact with the display device, infrared light emitted from one or more emitters is blocked and this blockage is detected by one or more corresponding sensors that cease to detect infrared light. For example, light emitted from an x-axis emitter 26 is blocked and this blockage is detected by a corresponding x-axis sensor 28 that ceases to detect infrared light. The location of the affected x-axis sensor 28 is then interpreted as the x-axis coordinate of the touch event. Similarly, light emitted from a y-axis emitter 22 is blocked and this blockage is detected by a corresponding y-axis sensor 24 that ceases to detect infrared light. The location of the affected y-axis sensor 24 is then interpreted as the y-axis coordinate of the touch event.

However, infrared touch screens may be susceptible to accidental activation by random objects that may temporarily block the infrared beams such as an insect or dropped napkin, etc.

SUMMARY

A touch-sensitive display device includes a display. A transparent plate is provided in front of the display. A tactile sensor senses a touch event. The touch event may be, for example, a touch event initiated intentionally by a user. One or more infrared sensors are positioned in front of the transparent plate. The one or more infrared sensors identify a location of the touch event when the tactile sensor detects a touch event. Accordingly, unintentional events, for example, random objects falling within range of the infrared sensors, may not register as a touch event and inadvertent touch events may be minimized.

A method for locating a touch event on a touch-sensitive display device includes monitoring a tactile sensor to detect the occurrence of a touch event. When the occurrence of a touch event has been detected by the tactile sensor, a location of the touch event is identified based on one or more infrared sensors.

A method for retrofitting a touch-sensitive display includes affixing a tactile sensor to the touch-sensitive display such that the tactile sensor is in vibrational communication with a transparent plate of the touch-sensitive display. The tactile sensor is interfaced to a microprocessor of the touch-sensitive display. Logic of the touch-sensitive display is modified such that infrared sensors of the touch-sensitive display are activated based on tactile sensor data.

A computer system includes a processor and a program storage device readable by the computer system, embodying a program of instructions executable by the processor to perform method steps for locating a touch event on a touch-sensitive display device. The method includes monitoring a tactile sensor to detect the occurrence of a touch event. When the occurrence of a touch event has been detected by the tactile sensory a location of the touch event is identified based on one or more infrared sensors.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION OF THE DRAWINGS

Figure 1:
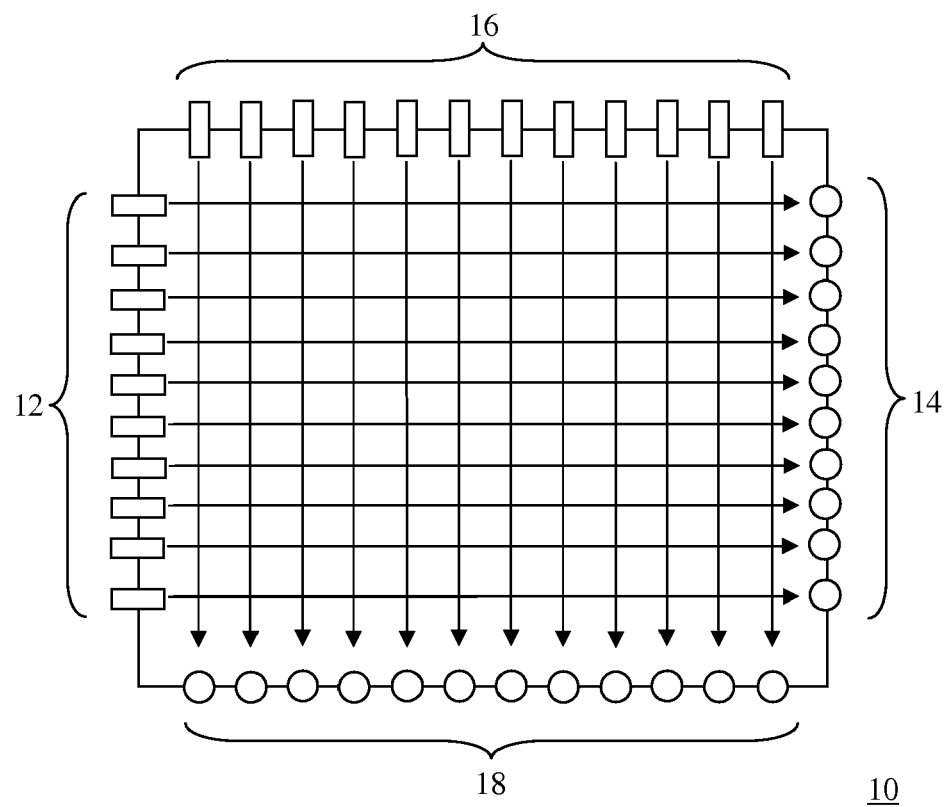
FIG. 1 shows a conventional infrared touch screen.
Figure 2:
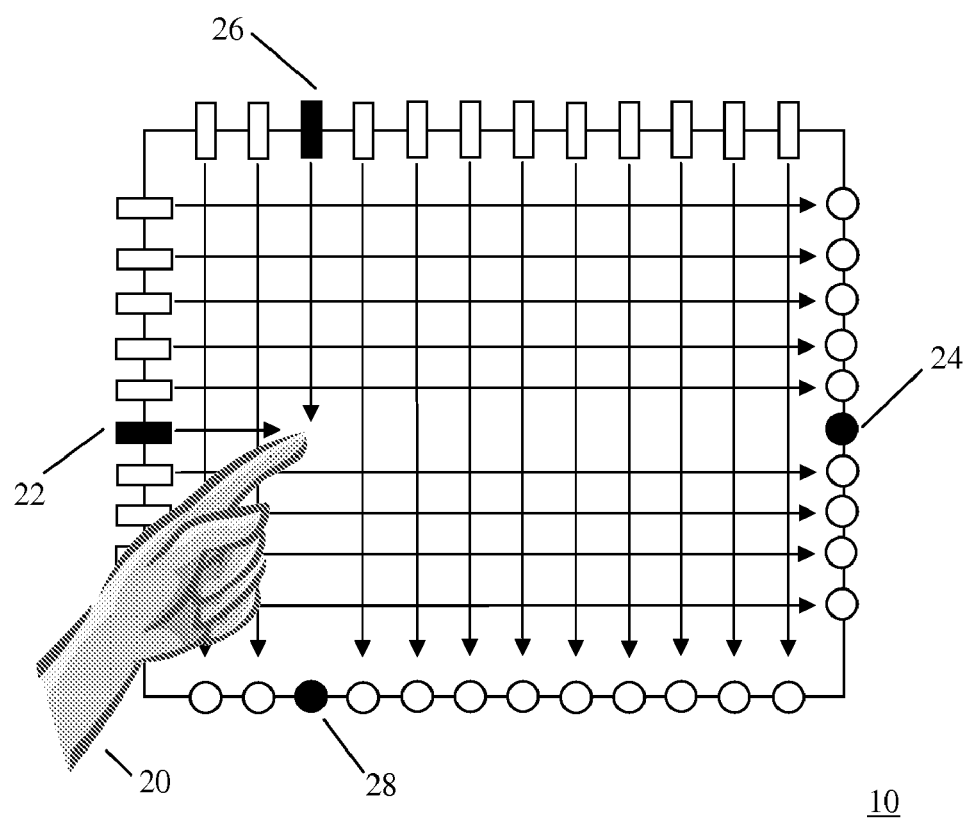
FIG. 2 shows a touch event occurring on the conventional infrared touch screen of FIG. 1.

In describing the exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention utilize an infrared touch screen that activates and/or takes a reading when triggered by a tactile sensor that detects a touch event using a technology other than an infrared sensor. As touch screen detection utilizes both infrared sensors and tactile sensors, accidental detection is minimized.

The tactile sensor may be a sensor that is able to sense shock, impact, vibration, and/or displacement. For example, the tactile sensor may foe a low-cost piezoelectric sensor.

Figure 3:
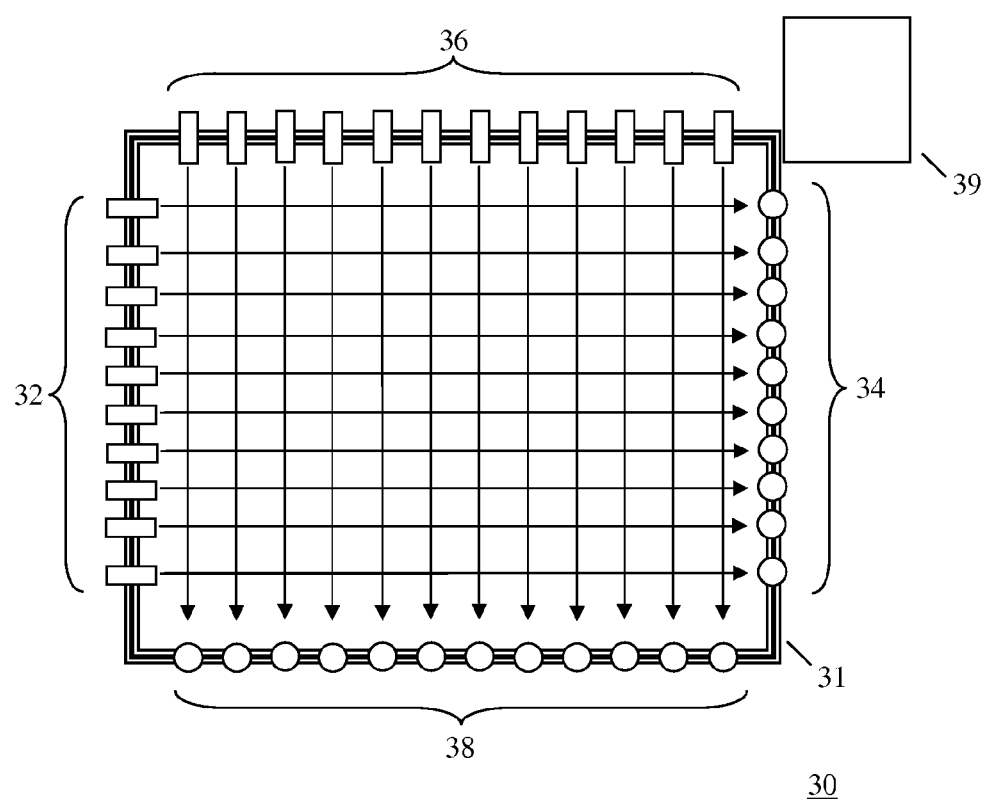
FIG. 3 shows a touch screen according to an exemplary embodiment of the present invention.
Figure 4:
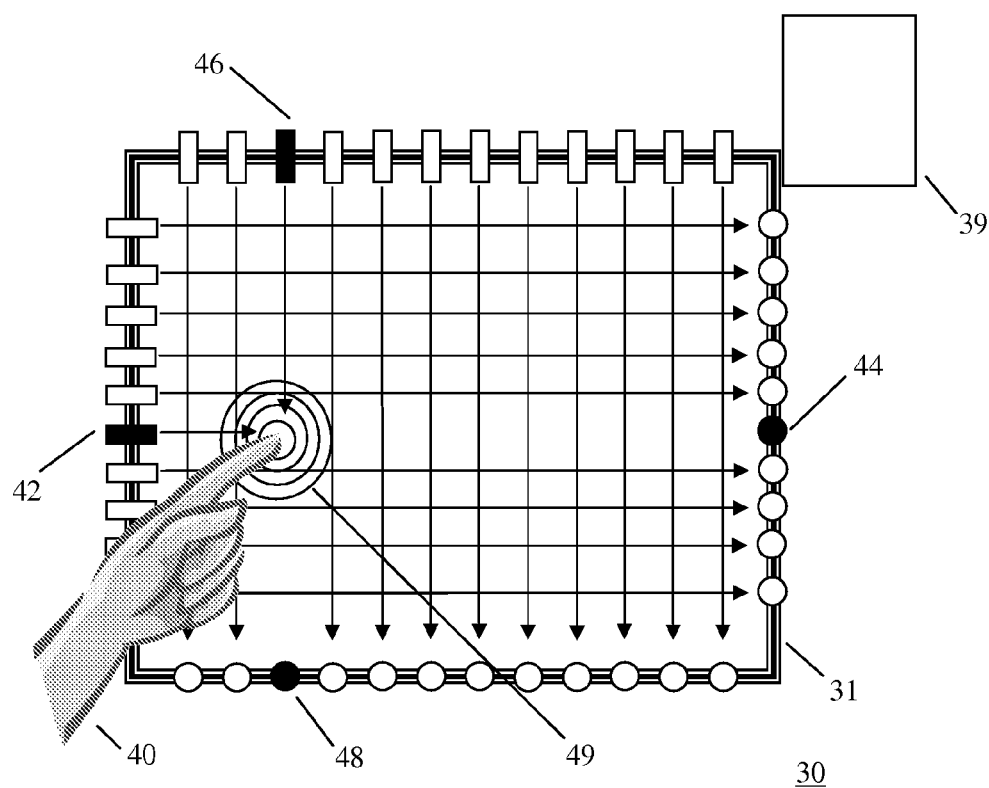
FIG. 4 shows a touch event occurring on the touch screen of FIG. 3.

FIGS. 3 and 4 illustrate exemplary embodiments of the present invention. Referring to FIG. 3, a touch screen 30 may include a display device (not shown). The display device may be, for example, a liquid crystal display (LCD). Alternatively, the display device may be any other display technology known in the art, for example, a cathode ray tube (CRT) monitor, an organic light-emitting diode (OLED) display, or a plasma display panel (PDP).

A transparent plate 31 may be mounted in front of the display device. The transparent plate 31 may be, for example, glass, plastic or crystal. The transparent plate 31 may serve to protect the display device, for example, when the touch screen is used in a public setting or under adverse conditions.

The transparent plate 31 may be a plate that is separate and distinct from, the display device. Alternatively, the transparent plate 31 may be a part of the display device, for example, an outer layer of an LCD.

The transparent plate 31 may be mounted in such a way as to allow the plate 31 to vibrate. Accordingly, the transparent plate 31 may be mounted such that vibrations are not overly dampened. For example, double-sided foam tape may be used to attach the glass plate to the display device and/or a touch screen frame or bezel.

A set of x-axis infrared emitters 36 may be mounted above the transparent plate 31. Accordingly, from the perspective of a user facing the touch screen 30, the x-axis infrared emitters 36 may occupy a plane closest to the user, the transparent plate 31 may occupy a plane behind the x-axis infrared emitters 36 and the display device may occupy a plane behind the transparent plate 31.

A set of x-axis infrared sensors 38, corresponding to the x-axis infrared emitters 36, may be mounted on substantially the same plane as the x-axis infrared emitters 36. Accordingly, light emanating from, the x-axis infrared emitters 36 may be detected by a corresponding x-axis infrared sensor 38.

Similarly, a set of y-axis infrared emitters 32 may be mounted on substantially the same plane as the x-axis emitters 36 and sensors 38. A corresponding set of y-axis infrared sensors 34 may be mounted on substantially the same plane as the other emitters and sensors 36, 32, and 38. Accordingly, light emanating from the y-axis infrared emitters 32 may be detected by a corresponding y-axis infrared sensor 34.

The infrared emitters 36 and 32 may include a light emitting diode (LED), incandescent light source or laser diode emitting light within the range of approximately 750 nm through 1 mm. The emitters may also include one or more optical lenses that may focus the infrared light into a narrow beam.

The infrared sensors 33 and 34 may include a photodiode for detecting infrared light. The sensors may also include an infrared lens to block ambient light. The infrared sensors 33 and 34 may directly correspond to the infrared emitters 36 and 32. Alternatively, a direct correspondence is not required.

As can be seen from FIG. 4, when a user creates a pointing event by touching a finger 40 or stylus to the transparent plate 31, infrared light to one or more x-axis sensors 38 and y-axis sensors 34 is blocked. For example, infrared light from a particular x-axis emitter 46 may be blocked from reaching a corresponding x-axis sensor 48 and infrared light from a particular y-axis emitter 42 may be blocked from reaching a corresponding y-axis sensor 44.

However, there need not be a one-to-one correlation between emitter and sensor. The emitters (or simply one single emitter) may provide a source of infrared light that is detected by the set of infrared sensors. The sensor data may then be analyzed to detect a blocked area where sensed infrared light is substantially below its unblocked level. Alternatively, the blocking of infrared light caused by the touch event may create an interference pattern on the set of sensors that may be interpreted to localize the touch event.

Where only a single infrared emitter is used per axis, the infrared light may foe focused into a fan-beam shape or repeatedly swept from one side to the other.

A tactile sensor 39, for example, a low-cost vibration sensor such as a low-cost piezoelectric sensor, may be used to detect the pressure or vibration of a touch event. The tactile sensor 39 need not be sensitive enough to locate the precise position of the touch event, it may be sufficient for the tactile sensor 39 to sense the existence of a touch event. The tactile sensor 39 may be mounted in contact with the transparent plate 31 such that vibration and/or shock 49 associated with a touch event is conducted thorough the glass plate to the tactile sensor 39. The tactile sensor 39 may also be anchored to a relatively stable portion of the touch screen 30 that experiences little to no vibration and/or shock as a result of a touch event.

Figure 5:
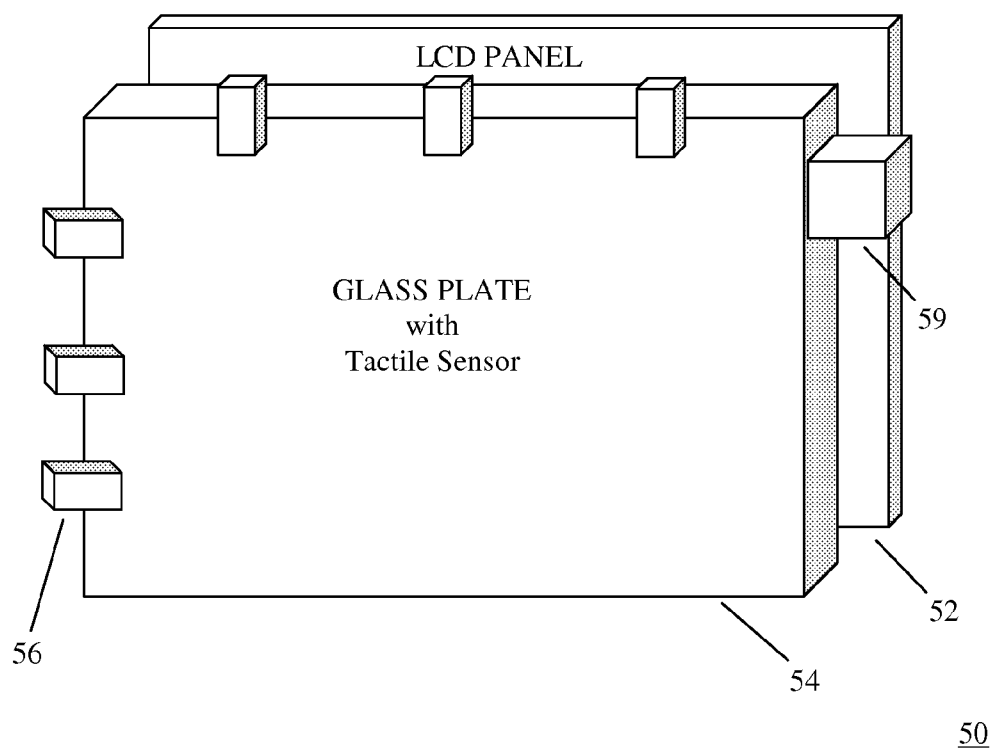
FIG. 5 shows an exploded, perspective view of a touch screen according to an exemplary embodiment of the present invention.

FIG. 5 is a perspective exploded view showing a configuration of a touch screen display 50 according to an exemplary embodiment of the present invention. A display device, for example, and LCD panel 52 may be positioned to the rear of the touch screen display 50. The transparent plate, for example, a glass plate 54 may be provided in front of the LCD panel 52 to protect the LCD panel 52 and to conduct vibration/shock from a touch event. A tactile sensor, for example, a vibration/shock sensor 59 may be provided in vibrational communication with the glass plate 54. The x-axis and y-axis emitters and sensors 56 may be provided in front of the glass plate 54 such that touch events contacting the glass plate 54 may be observed by the emitters and sensors 56.

Figure 6:
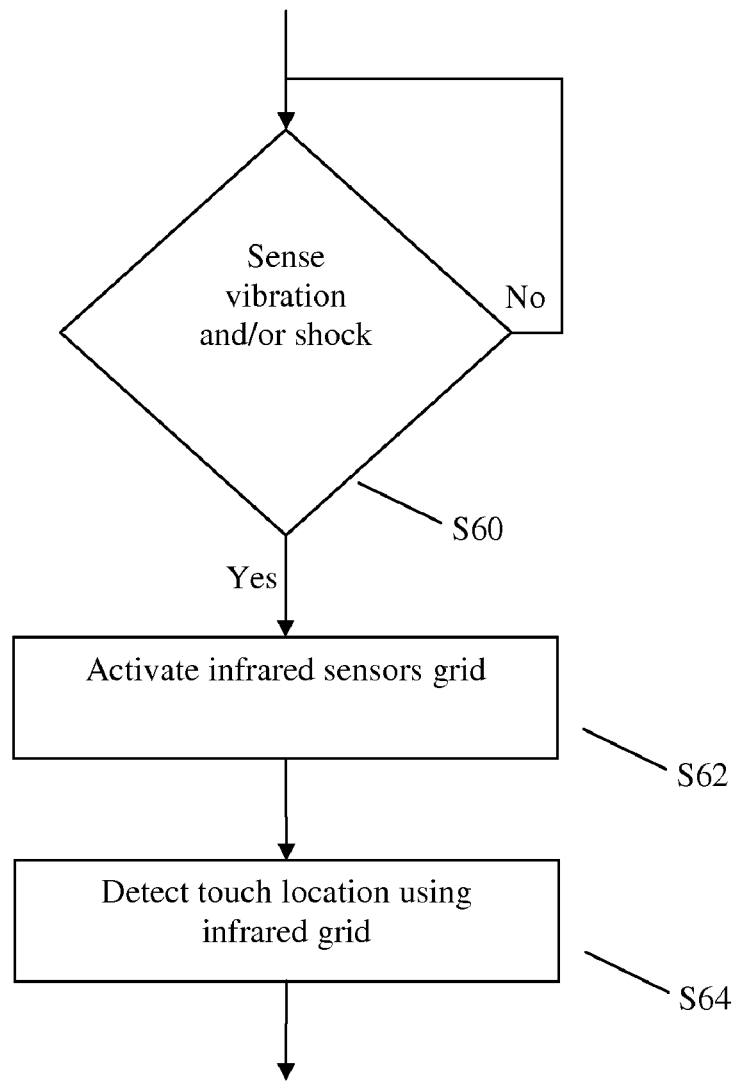
FIG. 6 shows a method for locating a touch event on a touch screen according to an exemplary embodiment of the present invention.

Exemplary embodiments of the present invention utilize one or more tactile sensors to determine the presence of a touch event and then use infrared emitters and sensors to locate the position of the touch event on the touch screen. FIG. 6 is a flow chart showing a method for locating a touch event according to an exemplary embodiment of the present invention. First, it is determined whether a touch event has occurred using one or more tactile sensors (Step S60). For example, a vibration and/or shock sensor in vibrational communication with a transparent plate of the touch screen may be monitored by a touch screen, controller. For as long as no touch event is so detected (No, Step S60), the touch screen controller will continue to monitor the tactile sensor for signs of a touch event (Step S60). When a touch event is detected (Yes, Step S60) a grid of x-axis and y-axis infrared emitters and sensors are activated (Step S62). Activation of the infrared grid may include both powering the infrared emitters and monitoring the infrared sensors. Alternatively, the infrared emitters may be continuously powered and activation of the grid may include monitoring the infrared sensors.

Activation of the infrared grid may also include performing repeated sensor sweeps where one sensor among the plurality of sensors is read at a time.

After the infrared sensor grid has been activated, the read sensor data may be interpreted by the touch screen controller to determine the location of the touch event.

The touch screen controller may be an integrated circuit or printed circuit board responsible for the function and data processing associated with determining a location of a touch event. One or more touch screen controller functions may be performed by a central processing unit (CPU) associated with a computer or other electronic appliance utilizing the touch screen. In this respect, the touch screen controller may be embodied either as a discrete element of hardware, as one or more applications executed on a CPU or some combination thereof.

Figure 7:
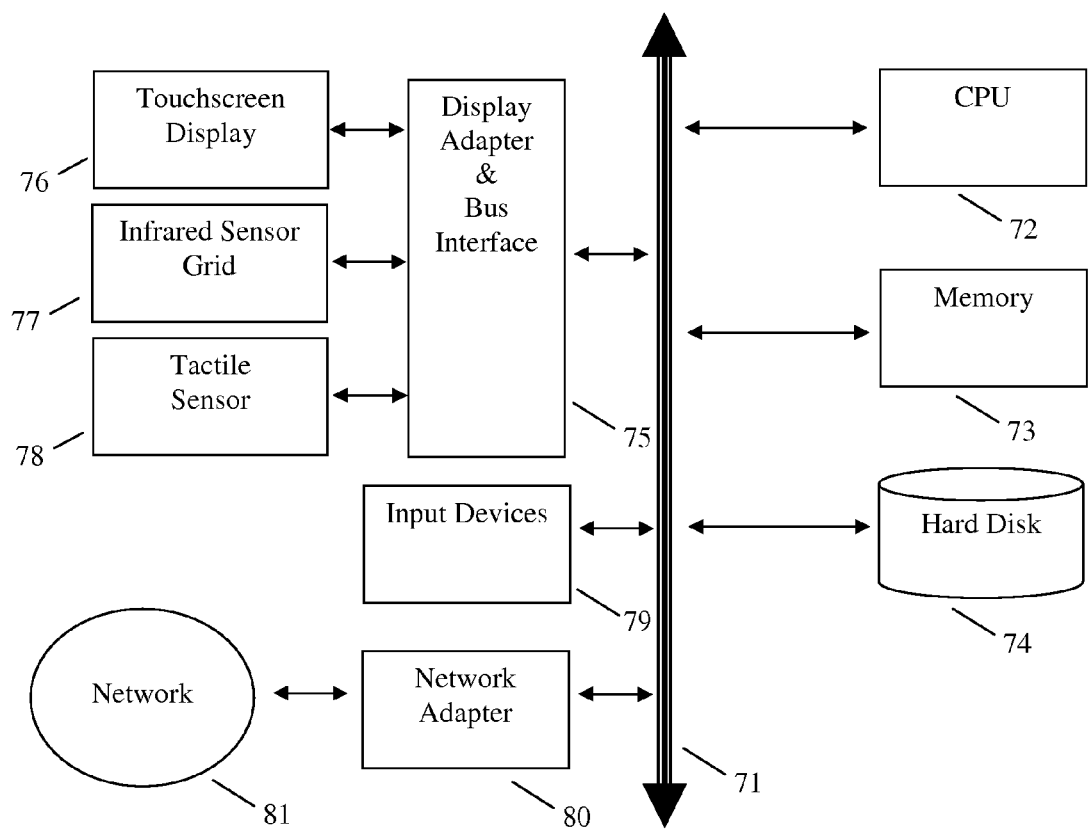
FIG. 7 shows an example of a computer system capable of implementing the method and apparatus according to an exemplary embodiment of the present invention.

Touch screens according to exemplary embodiments of the present invention may operate as an input-output device connected to a computer or other electronic appliance. FIG. 7 is a diagram showing a configuration of such a computer system according to an exemplary embodiment of the present invention. The computer system 70 may include a primary data bus 71, for example, a front side bus (FSB). A CPU 72 may be connected to the primary data bus 71. System memory 73, for example, random access memory (RAM) may also be connected to the primary data bus 71. One or more data storage devices, for example, a hard disk 74 or a flash-memory based storage device may be connected to the primary data bus 71, for example, over an advanced technology attachment (ATA) interface. Other storage devices, for example, an optical drive (not shown) may be connected to the primary data bus 71, for example, over an ATA interface. Input devices, such as a keyboard and/or mouse may be connected to the primary data bus 71 over a universal serial bus (USB) interface and/or over one or more legacy ports. A network adapter 30 may also be connected to the primary data bus 71, for example, over a peripheral component interconnect (PCI) bus. The network adapter 80 may be connected to a computer network 81, for example, the Internet.

A display adapter and touch screen controller 75 may also be connected to the primary data bus 71. The display adapter and touch screen controller 75 may be embodied in one or more devices. For example, a discrete display adapter may be connected to the primary data bus 71 over an advanced graphics port (AGP) data bus or a PCI Express data bus. The display adapter may provide video processing function for driving the display 76. The infrared sensor grid may have its own controller and may be connected to the primary data bus 71 through a USB interface or a legacy interface. Similarly, the vibration/shock sensor 78 may have its own controller or may share a controller with the infrared sensor grid 77.

The CPU 72 may be used to execute an operating system installed on the hard disk 74. One or more drivers for interfacing with the touch screen may be installed on the hard disk 74 as well. An application embodying a set of instructions for performing exemplary embodiments of the present invention may also be installed on the hard disk 74.

The CPU 72 and related computer hardware may be embodied in a general purpose computer connected to the touch screen. Alternatively, one or more of the hardware elements may be incorporated into a custom integrated circuit or printed circuit board for incorporation into a touch screen product.

Exemplary embodiments of the present invention may be applied to a conventional infrared touch-sensitive display by retrofitting the conventional infrared touch-sensitive display. In retrofitting the conventional display, a tactile sensor may be affixed to the touch-sensitive display, for example, to a transparent plate of the touch-sensitive display. If the conventional touch-sensitive display utilizes a protective glass plate then the tactile sensor may be affixed to the protective glass plate. If the conventional touch-sensitive display does not have a protective glass plate then the tactile sensor may be affixed directly to an outer layer of the display.

Where a protective glass plate is present, the way in which the glass plate is mounted may be adjusted to allow for increased freedom of vibration. The tactile sensor may be affixed in vibrational communication with the glass plate.

The tactile sensor may be interfaced to a microprocessor of the conventional touch-sensitive display, for example, by connecting it to an infrared sensor controller. The logic of the conventional touch-sensitive display may then be modified such that infrared sensors of the touch-sensitive display are activated based on tactile sensor data.

The above specific exemplary embodiments are illustrative, and many variations can be introduced on these embodiments without departing from the spirit of the disclosure or from, the scope of the appended claims. For example, elements and/or features of different exemplary embodiments may be combined with each other and/or substituted for each other within the scope of this disclosure and appended claims.

What is claimed is:

1. A touch-sensitive display device, comprising:
    a display;
    a transparent plate provided in front of the display device;
    a single tactile sensor mounted in contact with the transparent plate to a side surface of the transparent plate, sensing a touch event; and
    a plurality of infrared sensors and a plurality of corresponding infrared emitters positioned in front of the transparent plate, wherein the plurality of infrared sensors identify a location of the touch event when the tactile sensor detects a touch event and when the tactile sensor does not detect a touch event, each of the plurality of infrared emitters remains inactive,
    wherein the single tactile sensor is mounted to the side surface of the transparent plate such that the single tactile sensor is beyond the range of perception of the plurality of infrared sensors.

2. The touch-sensitive display device of claim 1, wherein the display is an LCD panel.

3. The touch-sensitive display device of claim 1, wherein the transparent plate is mounted to allow the transparent plate to vibrate.

4. The touch-sensitive display device of claim 1, wherein the transparent plate is mounted to the touch-sensitive display device using double-sided foam tape.

5. The touch-sensitive display device of claim 1, wherein the transparent plate is an outer layer of the display.

6. The touch-sensitive display device of claim 1, wherein the transparent plate is a glass plate.

7. The touch-sensitive display device of claim 1, wherein the tactile sensor is a sensor that detects vibration, shock or displacement of the transparent plate.

8. The touch-sensitive display device of claim 1, wherein the tactile sensor is a piezoelectric sensor.

9. The touch-sensitive display device of claim 1, wherein the tactile sensor is in vibrational communication with the transparent plate.

10. The touch-sensitive display of claim 1, wherein the plurality of infrared sensors comprises a set of x-axis infrared sensors for detecting an x-axis coordinate of the touch event and a set of y-axis infrared sensors for detecting a y-axis coordinate of the touch event and the plurality of corresponding infrared emitters comprises a set of x-axis infrared emitters for emitting infrared light in the direction of the x-axis infrared sensors and a set of y-axis infrared emitters for emitting infrared light in the direction of the y-axis infrared sensors, wherein the coordinates of the touch event are detected based on the amount of infrared light detected by the respective infrared sensors.

11. A method for locating a touch event on a touch-sensitive display device, comprising:
monitoring a single tactile sensor mounted in contact with a side surface of a transparent plate provided in front of the touch-sensitive display device to detect the occurrence of a touch event;
when the occurrence of a touch event has been detected by the tactile sensor, identifying a location of the touch event based on a plurality of infrared sensors and a plurality of corresponding infrared emitters; and
when the occurrence of a touch event has not been detected by the tactile sensor, each of the plurality of infrared emitters remains inactive,
wherein the single tactile sensor is mounted to the side surface of the transparent plate such that the single tactile sensor is beyond the range of perception of the plurality of infrared sensors.

12. The method of claim 11, wherein the step of identifying a location of the touch event based on the plurality of infrared sensors and the plurality of corresponding infrared emitters comprises:
activating one or more infrared emitters of the plurality of corresponding infrared emitters;
reading the amount of infrared light detected by one or more infrared sensors of the plurality of infrared sensors; and
calculate the location of the touch event based on the amount of infrared light detected by each of the one or more infrared sensors and the relative position of each of the one or more infrared sensors.

13. The method of claim 11, wherein the tactile sensor detect the occurrence of a touch event by sensing vibration, shock or displacement of the touch-sensitive display device.

14. A method for retrofitting a touch-sensitive display, comprising:
affixing a single tactile sensor to the touch-sensitive display, comprising a display device, a transparent plate provided in front of the display device, and one or more infrared sensors positioned in front of the transparent plate for identifying a position of a touch event, such that the tactile sensor is in vibrational communication with the transparent plate of the touch-sensitive display, wherein the single tactile sensor is mounted in contact with a side surface of the transparent plate;
interfacing the tactile sensor to a microprocessor of the touch-sensitive display; and
modifying logic of the touch-sensitive display such that infrared sensors of the touch-sensitive display remain inactive until a tactile event is observed by the tactile sensor, and are activated when the tactile event is observed by the tactile sensor.

15. The method of claim 14, wherein the tactile sensor is a sensor that detects vibration, shock or displacement of the transparent plate.

16. The method of claim 14, wherein the tactile sensor is a piezoelectric sensor.

17. The method of claim 14, wherein the step of modifying the logic of the touch-sensitive display comprises changing or replacing computer-executable code executed by a microprocessor of the touch-sensitive display.

18. A computer system comprising:
a processor; and
a program storage device readable by the computer system, embodying a program of instructions executable by the processor to perform method steps for locating a touch event on a touch-sensitive display device, the method comprising:
monitoring a single tactile sensor mounted in contact with a side surface of a transparent plate provided in front of the touch-sensitive display device to detect the occurrence of a touch event;
when the occurrence of a touch event has been detected by the tactile sensor, identifying a location of the touch event based on a plurality of infrared sensors and a corresponding plurality of infrared emitters; and
when the occurrence of a touch event has not been detected by the tactile sensor, each of the plurality of infrared emitters remains inactive,
wherein the single tactile sensor is mounted to the side surface of the transparent plate such that the single tactile sensor is beyond the range of perception of the plurality of infrared sensors.

19. The computer system of claim 18, wherein the step of identifying a location of the touch event based on the plurality of infrared sensors and the corresponding plurality of infrared emitters comprises:
activating one or more infrared emitters of the corresponding plurality of infrared emitters;
reading the amount of infrared light detected by one or more infrared sensors of the plurality of infrared sensors; and
calculate the location of the touch event based on the amount of infrared light detected by each of the one or more infrared sensors and the relative position of each of the one or more infrared sensors.

20. The computer system of claim 18, wherein the tactile sensor detect the occurrence of a touch event by sensing vibration, shock or displacement of the touch-sensitive display device.

21. The method of claim 14, wherein the single tactile sensor is affixed to the side surface of the transparent plate such that the single tactile sensor is beyond the range of perception of the one or more infrared sensors.

* * * * *